(12) United States Patent
Senseby et al.

(10) Patent No.: US 6,695,405 B2
(45) Date of Patent: Feb. 24, 2004

(54) SEAT DEVICE INCLUDING A FOLD-DOWN BACK

(75) Inventors: François Senseby, Chatenay Malabry (FR); Jean-François Pierrey, Bourg la Reine (FR); François Fourrey, Corquilleroy (FR)

(73) Assignee: Faurecia Siegesd' Automobile, Boulogne (FR)

( * ) Notice: Subject to any disclaimer, the term of this patent is extended or adjusted under 35 U.S.C. 154(b) by 0 days.

(21) Appl. No.: 10/075,525

(22) Filed: Feb. 14, 2002

(65) Prior Publication Data
US 2002/0113480 A1 Aug. 22, 2002

(51) Int. Cl.⁷ .................................. B60N 2/02
(52) U.S. Cl. .............. 297/378.1; 297/378.12; 297/335; 296/65.09
(58) Field of Search .......... 297/378.1, 378.12, 297/335, 337, 367; 296/65.09, 65.05, 65.16

(56) References Cited

U.S. PATENT DOCUMENTS

| 5,015,026 A | | 5/1991 | Mouri |
| 5,482,349 A | * | 1/1996 | Richter et al. |
| 5,542,745 A | * | 8/1996 | Takeda et al. |
| 5,641,202 A | * | 6/1997 | Rus |
| 5,779,313 A | | 7/1998 | Rohee |
| 6,070,934 A | * | 6/2000 | Schaefer et al. |
| 6,123,380 A | * | 9/2000 | Sturt et al. |

FOREIGN PATENT DOCUMENTS

| DE | 19949759 | 10/2000 |
| FR | 2634430 | 5/1991 |
| FR | 2740406 | 7/1998 |
| FR | 2779688 | 12/1999 |
| JP | 56167526 | 12/1981 |
| JP | 58039535 | 3/1983 |
| WO | WO 96/20848 | 7/1996 |

OTHER PUBLICATIONS

French Search Report for Application Nos. FA 599284 and FR 0102153, report dated Oct. 16, 2001.

* cited by examiner

*Primary Examiner*—Laurie K. Cranmer
(74) *Attorney, Agent, or Firm*—Marshall, Gerstein & Borun LLP

(57) ABSTRACT

A seat device comprises a base and a seat itself comprising a back and a seat proper. The back comprises a bottom portion and a top portion pivotally mounted on the bottom portion via a first locking mechanism. The bottom portion of the back is pivotally mounted on the base via a second locking mechanism. Both locking mechanisms can be unlocked simultaneously so as to allow the top portion to be retracted into the bottom portion within a cavity provided in the base.

9 Claims, 6 Drawing Sheets

SEAT DEVICE INCLUDING A FOLD-DOWN BACK

FIELD OF THE INVENTION

The present invention relates to a seat devices including fold-down backs.

More particularly, the invention relates to a seat device comprising a base (e.g. the floor of a vehicle) and a seat carried by the base, the seat comprising a back and a seat proper extending between a rear end close to the back and a front end remote from the back, the seat proper being pivotally mounted on the base about a first transverse horizontal pivot axis close to the front end of said seat proper to pivot between a normal, in-use position that is substantially horizontal and a raised position that is substantially vertical, the back itself comprising:

a bottom portion connected to the base; and a top portion pivotally mounted on the bottom portion to pivot about a second transverse horizontal pivot axis, the top portion of the back being connected to the bottom portion by a locking mechanism movable between an unlocked state enabling the top portion of the back to pivot freely relative to the bottom portion, and a locked state suitable for holding the top portion of the back stationary relative to the bottom portion in at least both a first raised position and a first folded-down position where the back occupies a substantially horizontal or "table" configuration, the bottom portion of the back being pivotally mounted on the base to pivot about a third transverse horizontal pivot axis between firstly a raised position in which the second pivot axis is at a first height and secondly a folded-down position in which the second axis is at a second height that is lower than the first height, the top portion of the back being adapted to pivot relative to the bottom portion of folded-down position that is substantially horizontal when the bottom portion of the back pivots from its raised position to its folded-down position, and the bottom portion of the back being connected to the base via a second locking mechanism movable between firstly a locked state in which said second locking mechanism locks the bottom portion of the back relative to the base, at least when said bottom portion of the back is in the raised position, and secondly an unlocked state enabling the bottom portion of the back to pivot about the third axis.

BACKGROUND OF THE INVENTION

Document DE 199 49 759 describes an example of such a seat having a back that can be folded down to constitute a table (FIG. 2) or to occupy a position in which it is completely retracted (FIG. 3). When completely retracted, the bottom portion of the back has pivoted forwards. That type of seat gives satisfaction in terms of technical operation. However it suffers from the drawback of being relatively bulky, particularly lengthwise.

OBJECTS AND SUMMARY OF THE INVENTION

A particular object of the present invention is to mitigate that drawback.

To this end, according to the invention, in a seat device of the kind in question, the bottom portion of the back is adapted to pivot rearwards relative to the base while said bottom portion is passing from its raised position to its folded-down position.

By means of these dispositions, it is possible to lower the seat back completely so as to minimize the amount of space it occupies.

In preferred embodiments of the invention, it is optionally possible to make use of one or more of the following dispositions as well:

the top portion of the back is adapted to pivot relative to the bottom portion of the back about the second pivot axis so that the top portion of the back is retracted into a cavity provided in the base;

the first locking mechanism is resiliently urged towards its locked state and is movable into its unlocked state by means of a control member, and said first locking mechanism is adapted to remain in its unlocked state independently of any actuation of the control member while the top portion of the back is in an angular position intermediate between said first raised position and said first folded-down position;

the bottom portion of the back comprises two side plates on either side of the top portion of the back, leaving between them an empty space which receives the top portion of the back when the bottom portion of the back is in the folded-down position and the top portion of the back is in its second folded-down position;

the second locking mechanism is urged resiliently towards its locked state and is controlled by a handle member adapted to move said second locking mechanism into its unlocked position, the top portion of the back being secured to an actuator member which is adapted to move the handle member to unlock the second locking mechanism while said top portion of the back is pivoting from its first folded-down position towards its second folded-down position relative to the bottom portion of the back;

the first locking mechanism is adapted to remain in its unlocked state independently of any actuation of the control member while the top portion of the back is in an angular position intermediate between its first and second folded-down positions;

the first locking mechanism is adapted to lock in the first and second folded-down positions of the top portion of the back;

the first locking mechanism enables the raised position of the top portion of the back to be adjusted between said first raised position and a second raised position that slopes further rearwards; and the bottom portion of the back has a slot enabling a stop secured to the top portion of the back to pass through, said stop actuating the control finger during return of the top portion of the back between its second folded-down position and its first folded-down position.

BRIEF DESCRIPTION OF THE DRAWINGS

Other characteristics and advantages of the invention appear from the following description of an embodiment thereof, given by way of non-limiting example and with reference to the accompanying drawings.

In the drawings.

MORE DETAILED DESCRIPTION

In the various figures, the same references designate elements that are identical or similar.

Figure 1:
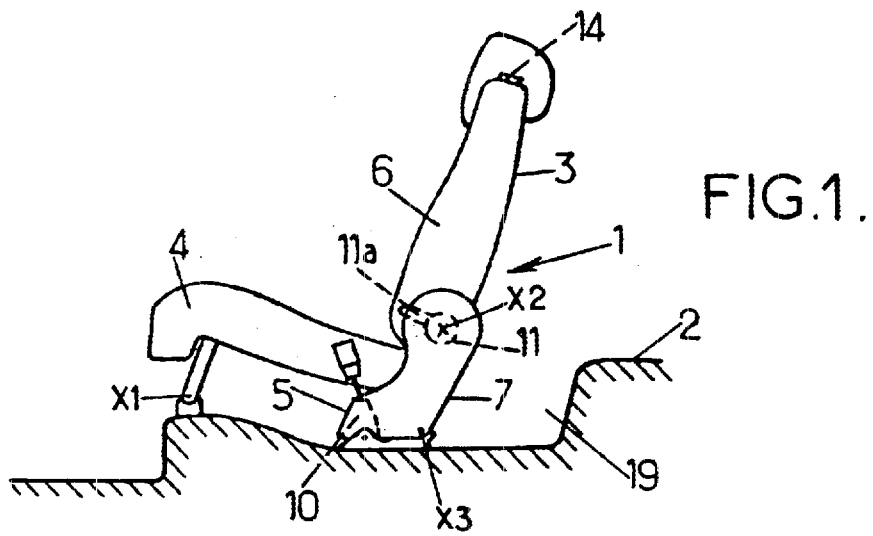
FIG. 1 is a side elevation view of a vehicle seat constituting an embodiment of the invention, shown in its normal, in-use position.

The seat device 1 shown in greater detail in FIG. 1 comprises a base 2, in this case constituted by the floor of a vehicle, and a seat carried by the base 2.

The seat comprises a back 3 and a seat proper 4 which extends between a rear end close to the back 3 and a front end remote from the back 3 (the terms "front" and "rear" are relative to the seat, and do not define the orientation of the seat within the vehicle).

The seat proper 4 is pivotally mounted on the base 2 about a first transverse horizontal pivot axis X1 close to the front end of said seat proper 4 to pivot between:

a normal, in-use position in which the seat proper 4 occupies a position where it is substantially parallel to the floor of the vehicle; and a raised position in which the seat proper 4 occupies a position in which it is substantially perpendicular to the floor 2 of the vehicle.

Figure 2:
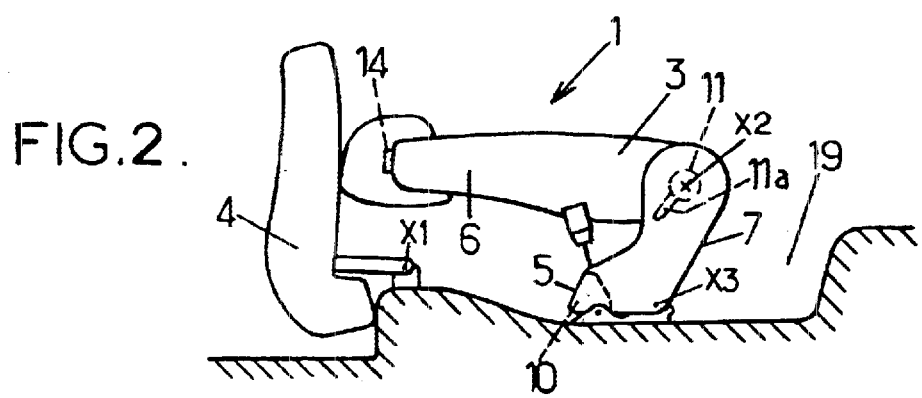
FIG. 2 is a side elevation view of the FIG. 1 seat with the top portion of the back occupying a first folded-down position which is substantially horizontal.
Figure 3:
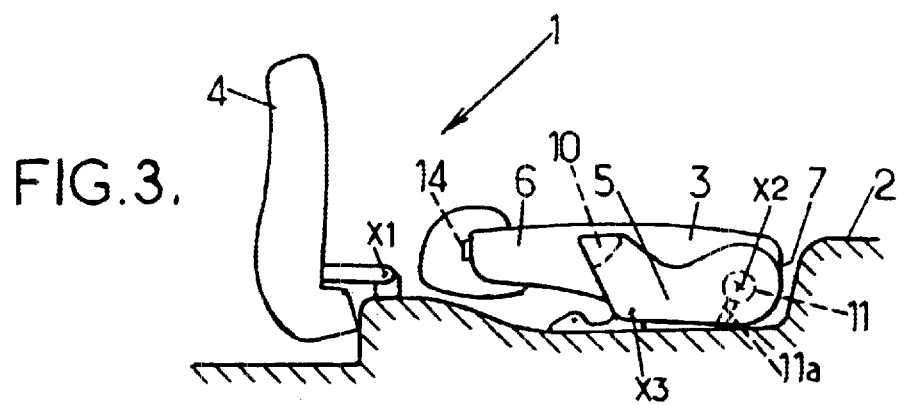
FIG. 3 is a side elevation view of the seat shown in FIG. 1, with the top portion of the back occupying a second folded-down position which is retracted in a cavity in the floor.

This raised position of the seat proper is shown in particular in FIGS. 2 and 3.

In addition, the back 3 of the seat shown in FIG. 1 itself comprises a bottom portion 5 connected to the base 2 and a top portion 6 hinged to the bottom portion 5 by means of a first locking mechanism 11 about a second horizontal transverse pivot axis X2.

The top portion 6 of the seat back is constituted by a rigid frame 12 covered in padding and a seat cover.

Figure 4:
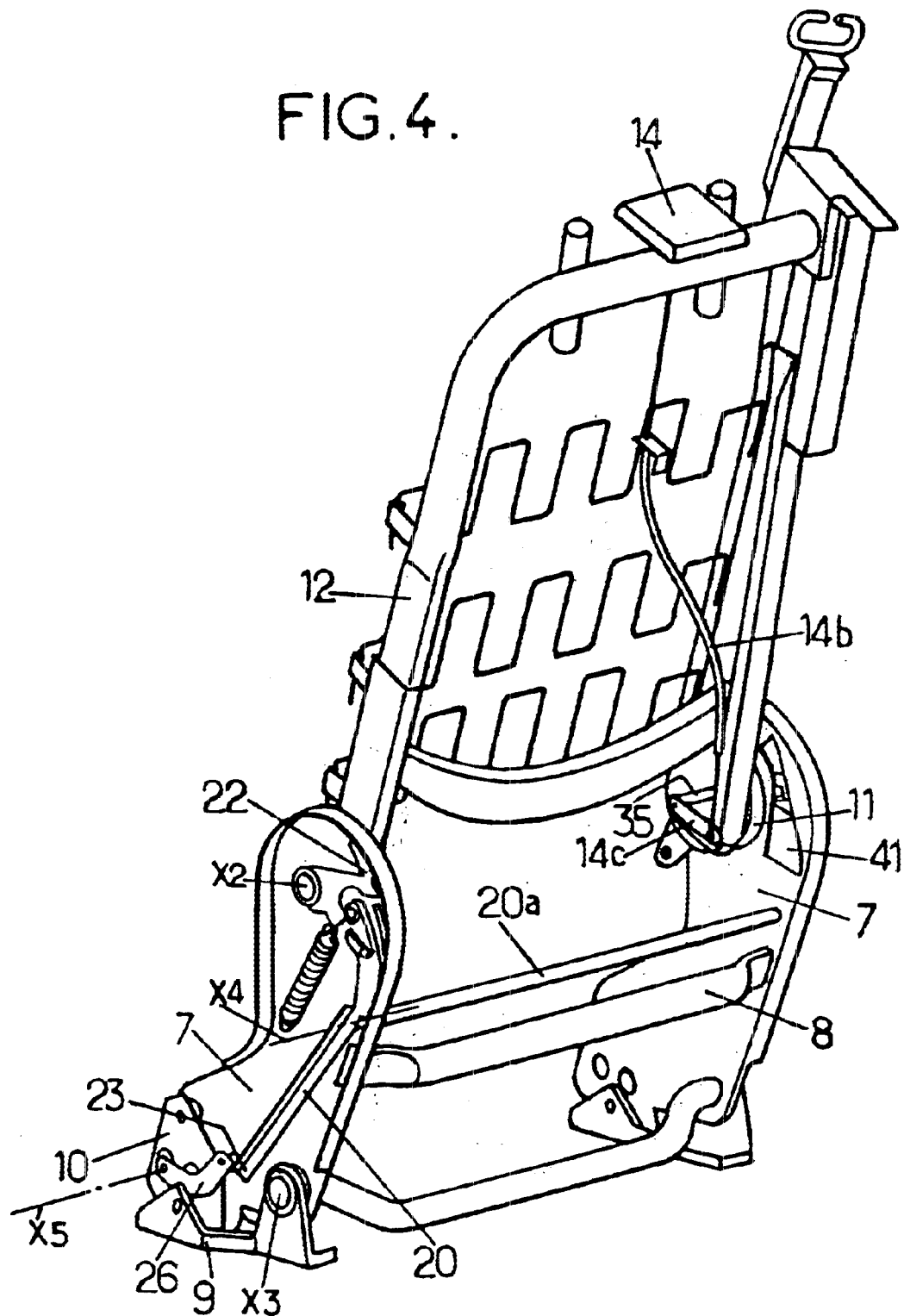
FIG. 4 is a perspective view of the seat back shown in FIG. 1, showing the mechanisms that enable the top portion of the seat back to be folded down.

The bottom portion 5 of the back 3 comprises two side plates 7, in particular plates made of metal and interconnected by at least one rear cross-member 8 that can be seen in FIG. 4. Each of the side plates 7 has its bottom connected to the base 2 via a supporting plate 9 fixed to said base, in particular by welding, by screw fastening, etc.

The bottom portion 5 of the back 3 is pivotally mounted on the support plate 9 secured to the base 2 about a third transverse horizontal pivot axis X3, the bottom portion 5 being connected to the support plate 9 via at least one locking mechanism 10.

In FIG. 1, the vehicle seat is represented in a normal, in-use configuration enabling a user to sit on it: the bottom portion 5 is in a substantially vertical position relative to the floor 2 of the vehicle, the top portion 6 of the back is situated substantially in line with the bottom portion 5 thereof, and it is locked in this configuration because the first locking mechanism 11 is in the locked state, and the seat proper 4 is in a position where it is substantially parallel to the floor 2 of the vehicle.

Starting from this normal, in-use position, the seat 1 can be placed in a "table" position as shown in FIG. 2.

For this purpose, the seat proper 4 is initially pivoted relative to the base 2 about the first transverse horizontal pivot axis X1 so as to occupy a position in which it is substantially perpendicular to the floor of the vehicle. Thereafter, the top portion 6 of the back is pivoted forwards about the axis X2 until it takes up a folded-down or table position which is substantially horizontal.

The top portion 6 of the back 3 is put into the table position after the first locking mechanism 11 has been put into an unlocked state by the user acting on a handle member 14.

When the top portion 6 of the back 3 reaches its folded-down, table position, the first locking mechanism returns to a locked state so as to prevent the top portion 6 moving relative to the bottom portion 5 of the seat back.

Detailed operation of the first locking mechanism 11 is described below.

FIG. 3 shows another position that can be occupied by the bottom portion 6 of the back.

To place the seat in this position, the user acts again on the handle member 14 which is situated on the seat so as to unlock both the first locking mechanism 11 and the second locking mechanism 10.

Figure 5:
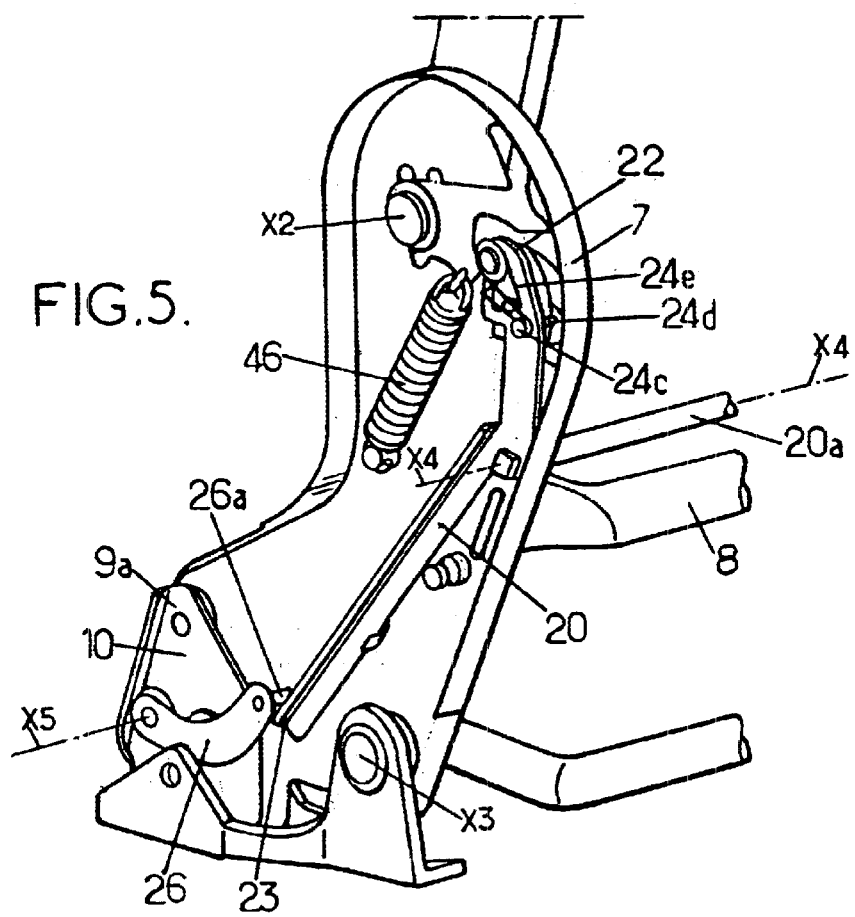
FIG. 5 is a perspective view of the bottom portion of the seat back.
Figure 6:
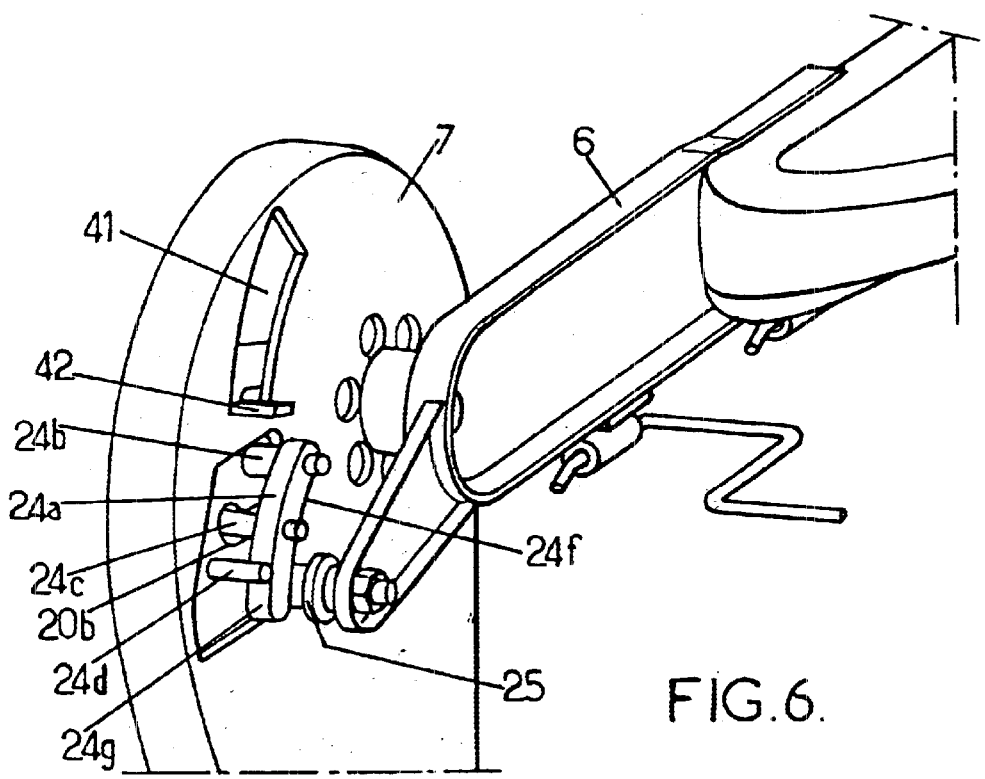
FIG. 6 is a perspective view showing a detail of the hinge zone between the top and bottom portions of the seat back.

The second locking mechanism 10 is shown in detail in FIGS. 4, 5, and 6, and it serves to release the bottom portion 5 of the back relative to the base 2, and more particularly relative to the support plate 9. The bottom portion 5 can then pivot rearwards about the third transverse horizontal pivot axis X3 and can go from a raised position to a folded-down position.

On pivoting about this third pivot axis X3, the bottom portion 5 of the back 3 is lowered and retracted into a cavity 19 formed in the base 2. During this movement, the top portion 6 of the back 3 pivots forwards relative to the bottom portion 5 about the second pivot axis X2 (the first locking mechanism 11 being again in an unlocked state) and takes up a position between the two side plates 7 of the bottom portion 5, thereby occupying a second folded-down position.

When the top portion 6 of the back 3 is folded within the bottom portion 5 and the assembly is received within the cavity 9 in line with the floor of the vehicle, the first locking mechanism 11 again takes up a locked state, thus preventing any untimely movement of the assembly.

It can be seen that between FIG. 2 (raised position of the bottom portion 5 of the back) and FIG. 3 (folded-down position of the bottom portion 5 of the back), the second pivot axis X2 is located initially at a first height and subsequently at a second height lower than the first.

FIG. 4 shows in detail the structure of the seat device of the invention. There can be seen in particular the handle member 14 which actuates the first locking mechanism 11 by means of a Bowden cable 14a running within the top portion 6 of the back, this cable controlling a lever 14b which in turns actuates the mechanism 11.

As shown in FIG. 5, the second locking mechanism 10 is integrated in one of the side plates 7 forming the bottom portion 5 of the back and it is controlled firstly by a control link 20 pivotally mounted within the side plates 7 about a horizontal transverse axis X4, and secondly by a latch 27 for locking with said support plate 9. A second control link (not shown in the figures) identical to the preceding control link is positioned within the second side plate that forms the other side of the seat, this second link being connected to the first by means of a connection bar 20a lying on the pivot axis X4. This second link serves to actuate a second latch 27 simultaneously.

The link 20 co-operates with the latch 27 via a connection finger 26, which is hinged to a plate 9a secured to the support plate 9. The connection finger is actuated by one of the ends 23 of said link 20, which end comes into contact with a stud 26a secured to the connection finger 26.

The other end 22 of said link 20 engages a connection mechanism 24 for co-operating with a control finger 25 carried by the top portion 6 of the back 3.

The connection mechanism 24 shown in FIGS. 5 and 6 comprises: a link 24a pivotally mounted on a pin 24b secured to the control link 20, a stop 24d projecting perpendicularly relative to said control link, a slot 20b formed through said link and receiving a guide peg 24c secured to the link 24a, which peg is slidable under drive from a resilient member 24e so as to urge the link 24a resiliently against the stop 24d.

When the top portion 6 of the back 3 passes from the first horizontal position to the second horizontal position (by pivoting the bottom portion 5 of the back about the pivot axis X3), the control finger 25 then travels along one of the faces 24f of the link 24a which, by contact between the other face 24g of the link 24a and the stop 24d, causes the control link 20 to pivot about the pivot axis X4 and unlock the second locking member 10 by means of the connection finger 26 which actuates the latch 27. This operation follows actuation by the user of the handle member 14 to unlock the first locking mechanism 11 so as to allow the top portion 6 of the back to pivot relative to the bottom portion of the back about the pivot axis X2.

Figure 7:
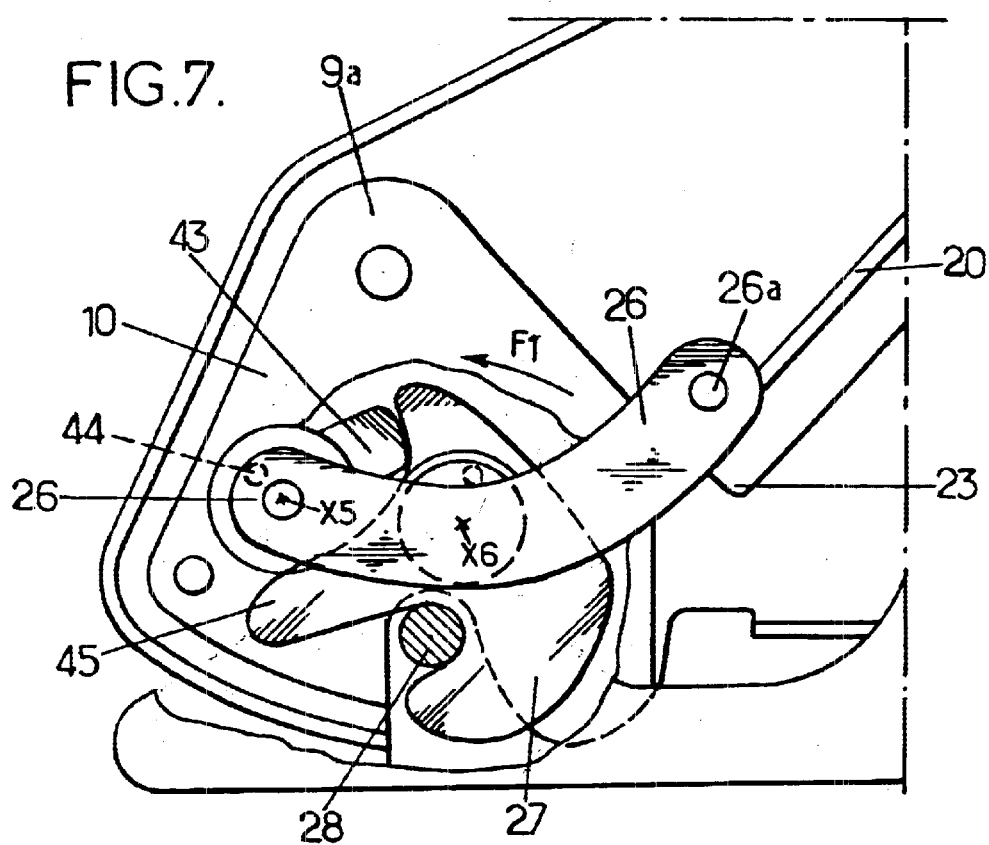
FIG. 7 is a side elevation view of the locking mechanism enabling the bottom portion of the seat back to be locked to the floor of the vehicle.

The locking mechanism 10 shown in FIG. 7 is adapted to cause the latches 27 which connect the bottom portion 5 of the back to the support plate 9 which is itself secured to the base 2 to pass from a locked state to an unlocked state, and back again.

The latch 27 can be in the form of a hook which penetrates into a recess 28 in the floor so as to engage beneath a rim of the recess or beneath a rigid transverse rod provided in said recess and thus acting as a catch. The latch can occupy two positions as a function of the angular movement of said control link 20.

A first position in which the hook is secured to the recess 28 itself secured to the base 2, and a second position in which the hook escapes from the recess 28 and allows the bottom portion 5 of the back 3 to pivot about the third pivot axis X3.

The latch 27 is pivotally mounted on a plate 9a secured to the support plate 9, the latch pivoting about a transverse horizontal axis X6 and being urged towards its unlocking position by a spring 44.

Furthermore, each latch 27 has a cam 43 which can occupy two positions as a function of the position of the connection finger 26, said positions corresponding respectively to a locked state and to an unlocked state of the latch 27.

In the rest position, the cam 43 holds the latch 27 in its locked position.

In the actuation position, the cam 43 secured to the connection member 26 releases the latch 27 which pivots in the direction of arrow f1 about the axis X6 into its unlocked position.

The latch 27 is relocked by the catch pressing against a projecting portion 45 of the latch 27, thereby causing the latch to tilt back into the locked position and enabling the cam 43 to be reengaged.

The stage in which the latch 27 is relocked corresponds either to the seat being returned to its normal position (FIG. 1), or else to the top portion 6 of the back 3 being repositioned in its first folded-down position (FIG. 2).

Figure 8:
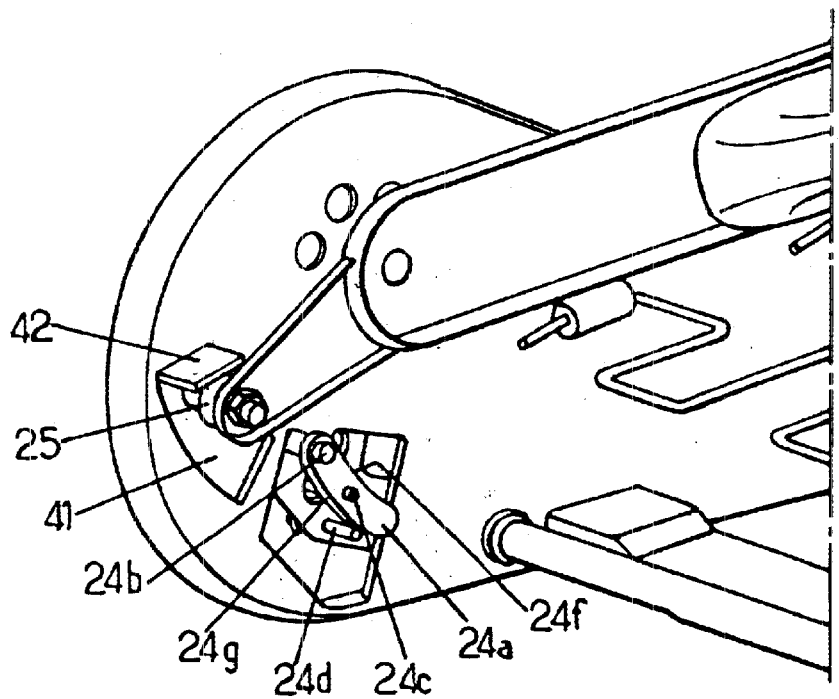
FIG. 8 is a perspective view showing a detail of the hinge zone between the top and bottom portions of the seat back, in the position shown in FIG. 3.

When the bottom portion 5 of the back is raised, as shown in FIG. 8, the link 24a which is in contact with the stop 24d pivots about the pin 24b under drive from the control finger 25. This control finger 25 is brought into contact with the link 24a by a stop 42 urged resiliently by a spring 46 (in particular a helical spring as shown in FIG. 5) inside a slot 41 made in the side plate 7 of the bottom portion 5 of the back 3.

When the bottom portion 5 of the back is again substantially vertical and Secured to the support plate 9 via the latches 27 of the second locking mechanism 10, the link 24a escapes completely around the pin 24b thus allowing the control finger to pass to the other side of the link 24a (as shown in FIG. 6).

Figure 9:
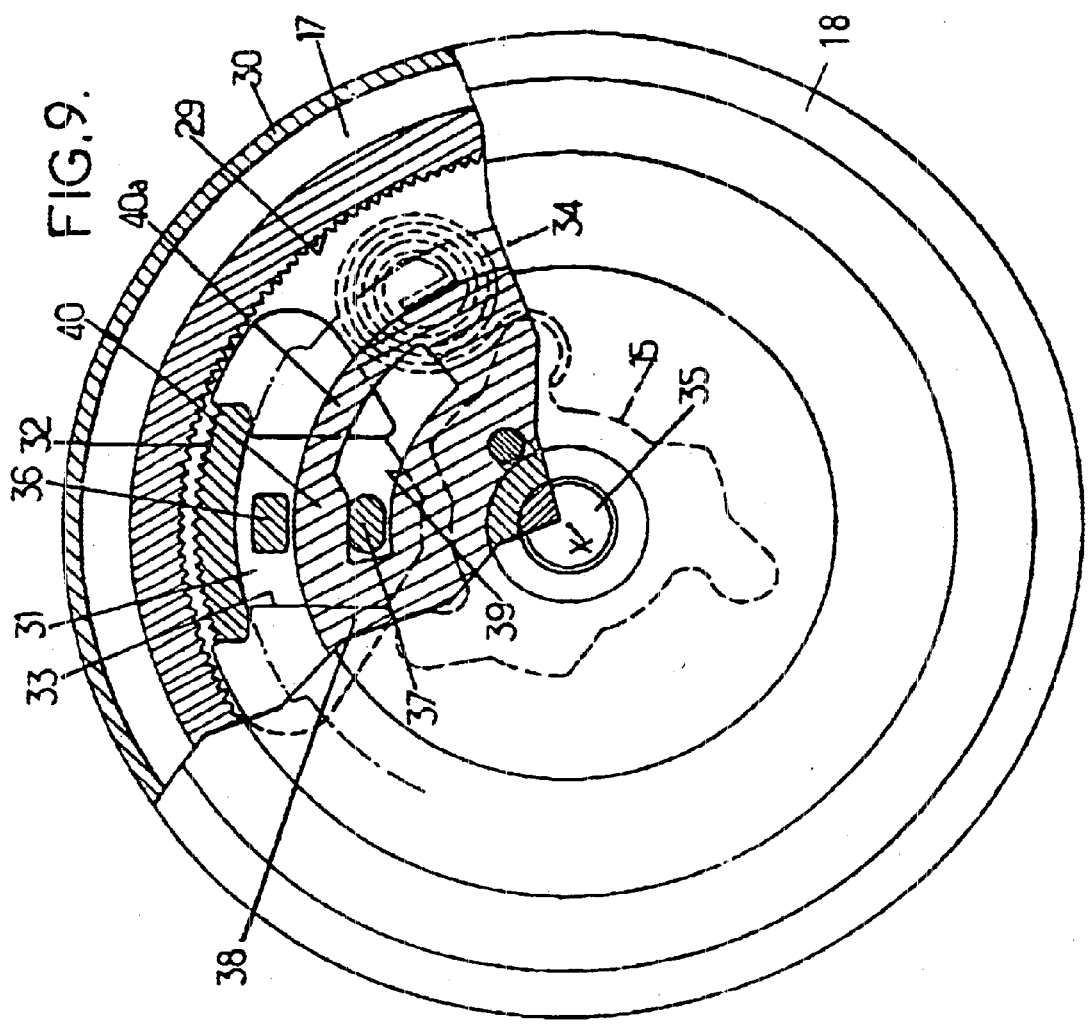
FIG. 9 is a fragmentary section view of the locking mechanism used in the seat back device of FIG. 1, the locking mechanism being shown in an unlocked state.

FIG. 9 shows the hinge forming the first locking mechanism 11 in an unlocked state. This hinge is of the type described for example in document FR-A-2 740 406 and it comprises:

a fixed first cheek plate 18 which is secured to the bottom portion 5 of the back 3;

a moving second cheek plate 17 which is secured to the top portion 6 of the back 3 and which pivots about the second horizontal pivot axis X2, the fixed and moving cheek plates 18 and 17 together forming a round housing, and the moving cheek plate 17 including a circular set of inwardly-directed teeth 29 located inside the housing;

a sheet metal ring 30 which is crimped around the fixed cheek plate 18 and which covers part of the moving cheek plate 17 so as to close the housing and hold the perimeters of the two cheek plates against each other;

three metal slugs 31 is provided with outwardly-directed teeth 32 suitable for co-operating with the inwardly-directed teeth 29 of the moving cheek plate 17, these three slugs 31 being guided to slide radially in guide grooves 33 formed in the fixed cheek plate 18, with the sliding directions of the three slugs 31 being mutually offset by 120° about the axis X2;

a cam 15 mounted rotatably about the axis X2 and acting on the three slugs 31, the cam 15 being movable angularly by means of a lever 11a which can be seen in FIG. 1 and which allows the slope of the back to be adjusted to take up a comfortable position, and this cam could also be moved by the handle member 14 between a rest position in which it urges the slugs towards a locking position in which the outwardly-directed teeth 32 of the slugs 31 co-operate with the inwardly-directed teeth 29 of the moving cheek plate 17 thus locking said moving cheek plate, and a working or unlocked position in which said cam 15 enables the slugs 31 to reverse into a retracted position where their outwardly-directed teeth 32 are disengaged from the inwardly-directed teeth 29 of the moving cheek plate 17, thus making it possible in particular to reach the first substantially horizontal folded-down position;

three springs 34 constituted in this case by spiral-wound blades urging the cam 15 angularly towards its rest position corresponding to the hinge being locked (only one of these springs is shown in FIG. 9 for simplification purposes);

a shaft 35 of axis X2 secured to the cam 15 and connected to the above-mentioned lever 14b, the shaft 35 being connected to a handle 11a shown very diagrammatically in FIG. 1, this handle 11a enabling the user of the seat to act on the hinge; and a control plate 38 secured to the cam 15, this plate having slots 39 which receive pegs 37 projecting from the respective slugs 31 so as to move the slugs 31 radially inwards, thereby unlocking the hinge 11 when the cam 15 is actuated.

Figure 11:
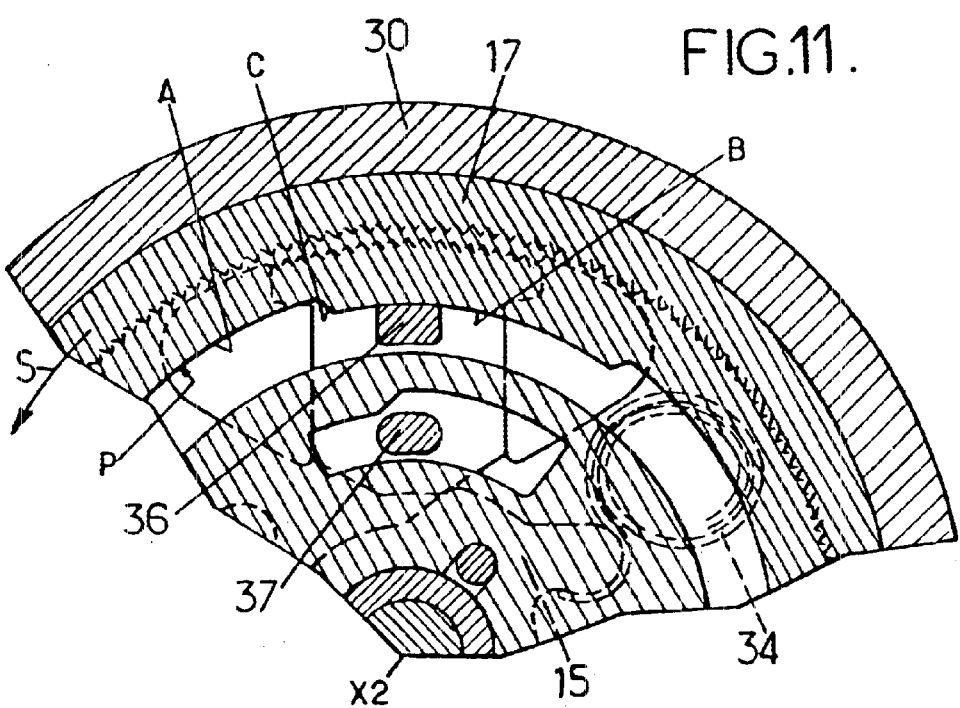
FIG. 11 shows the unlocked state of the FIG. 9 locking mechanism, when the top portion of the seat back is folded down.

In addition:

each slug 31 is provided with a peg 36 that projects from the slug 31 in the direction of axis X2; and the moving cheek plate 17 includes a track P with raised portions surrounding the pegs 36 (see FIG. 11).

The track P comprises circular arcs A and B of different diameters centered on the axis X2 and interconnected by slopes C.

Figure 10:
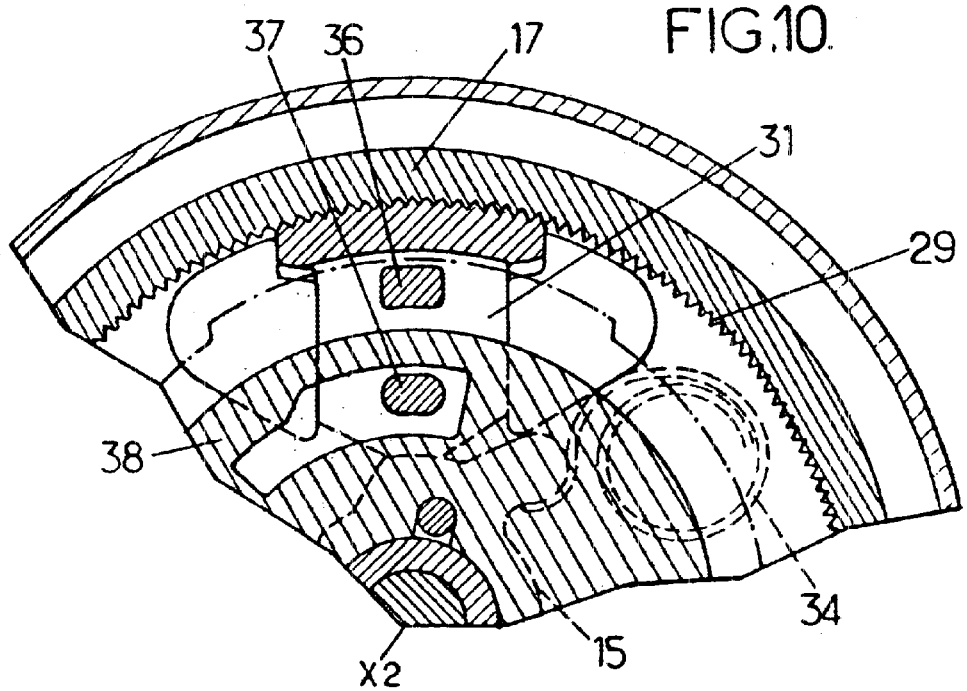
FIG. 10 is a fragmentary section view similar to FIG. 9, showing the locking mechanism in a locked state.

The diameters of the arcs A and B are determined in such a manner that:

when a larger diameter arc A is in register with a peg 36, the peg and thus the corresponding slug 31 can travel along its entire radial stroke and engage the teeth 29 so as to lock the top portion 6 of the back 3 (FIG. 10); and on the contrary, when an arc B of smaller diameter is in register with such a peg 36, after the track p has been moved angularly far enough around the axis X2 in the direction of arrow S, said peg 36 is held radially by said arc B in its disengaged position, closer to the axis X2, and corresponding to the hinge being unlocked (FIG. 11).

This enables the slugs 31 to be held in their disengaged or unlocking positions even if the user releases the handle member 14 while the back 3 is in an inclined position such that a circular arc B of the track P is radially in register with each of the pegs 36.

The angular positions in question of the back are those in which it is desired that the hinge should remain unlocked and corresponding, for example, to the stroke of the top portion of the back while being folded down from its raised position to its first folded-down position (FIG. 2) and then to the stroke of the top portion 6 of the back 3 while traveling from its first folded-down position to its second folded-down position (FIG. 3).

The radial locking of the slugs 31 generated by cooperation between the arcs B of the track P with the pegs 36 is naturally automatically eliminated once the arcs A replace the arcs B and occupy positions where they are radially in register with the pegs 36: the pegs 36 can then travel along their radial stroke in full, thus enabling the slugs again to lock the back in angular position.

In contrast, between the first and second folded-down positions of the top portion 6 of the back 3, the following arc B prevents the slugs 31 from locking with the ring 29.

The invention as described above provides multiple advantages.

It makes it possible to obtain a vehicle floor that presents a face that is substantially flat without it being necessary to remove the seat from the passenger compartment of a vehicle, with this being done merely by retracting the seat into a cavity provided for this purpose in the floor, and with this capability being in addition to that constituted by putting the top portion of the seat back into a table position.

What is claimed is:

1. A seat device comprising a base and a seat carried by the base, the seat comprising a back and a seat proper extending between a rear end close to the back and a front end remote from the back, the seat proper being pivotally mounted on the base about a first transverse horizontal pivot axis close to the front end of said seat proper to pivot between a normal, in-use position that is substantially horizontal and a raised position that is substantially vertical, the back itself comprising:

a bottom portion connected to the base; and a top portion pivotally mounted on the bottom portion to pivot about a second transverse horizontal pivot axis, the top portion of the back being connected to the bottom portion by a locking mechanism movable between an unlocked state enabling the top portion of the back to pivot freely relative to the bottom portion, and a locked state suitable for holding the top portion of the back stationary relative to the bottom portion in at least both a first raised position and a first folded-down position where the back occupies a substantially horizontal or "table" configuration, the bottom portion of the back being pivotally mounted on the base to pivot about a third transverse horizontal pivot axis between firstly a raised position in which the second pivot axis is at a first height and secondly a folded-down position in which the second axis is at a second height that is lower than the first height, the top portion of the back being adapted to pivot relative to the bottom portion of the back from its first folded-down position to a second folded-down position that is substantially horizontal when the bottom portion of the back pivots from its raised position to its folded-down position, and the bottom portion of the back being connected to the base via a second locking mechanism movable between firstly a locked state in which said second locking mechanism locks the bottom portion of the back relative to the base, at least when said bottom portion of the back is in the raised position, and secondly an unlocked state enabling the bottom portion of the back to pivot about the third axis, wherein the bottom portion of the back is adapted to pivot rearwards relative to the base while said bottom portion is passing from its raised position to its folded-down position.

2. A device according to claim 1, in which the top portion of the back is adapted to pivot relative to the bottom portion of the back about the second pivot axis so that the top portion of the back is retracted into a cavity provided in the base.

3. A device according to claim 1, in which the first locking mechanism is resiliently urged towards its locked state and is movable into its unlocked state by means of a control member, and said first locking mechanism is adapted to remain in its unlocked state independently of any actuation of the control member while the top portion of the back is in an angular position intermediate between said first raised position and said first folded-down position.

4. A device acorn to claim 1, in which the bottom portion of the back comprises two side plates on either side of the top portion of the back, leaving between them an empty space which receives the top portion of the back when the bottom portion of the back is in the folded-down position and the top portion of the back is in its second folded-down position.

5. A device according to claim 1, in which the second locking mechanism is urged resiliently towards its locked state and is controlled by a handle member adapted to move said second locking mechanism into its unlocked position, the top portion of the back being secured to an actuator member which is adapted to move the handle member to unlock the second locking mechanism while said top portion of the back is pivoting from its first folded-down position towards its second folded-down position relative to the bottom portion of the back.

6. A device according to claim 1, in which the first locking mechanism is adapted to remain in its unlocked state independently of any actuation of a handle member while the top portion of the back is in an angular position-intermediate between its first and second folded-down positions.

7. A device according to claim 6, in which the first locking mechanism is adapted to lock in the first and second folded-down positions of the top portion of the back.

8. A device according to claim 1, in which the first locking mechanism enables the raised position of the top portion of the back to be adjusted between said first raised position and a second raised position that slopes further rearwards.

9. A device according to claim 1, in which the bottom portion of the back has a slot enabling a stop secured to the top portion of the back to pass through, said stop actuating a control finger during return of the top portion of the back between its second folded-down position and its first folded-down position.

* * * * *

UNITED STATES PATENT AND TRADEMARK OFFICE
CERTIFICATE OF CORRECTION

PATENT NO.    : 6,695,405 B2
DATED         : February 24, 2004
INVENTOR(S)   : Francois Senseby et al.

It is certified that error appears in the above-identified patent and that said Letters Patent is hereby corrected as shown below:

Column 9,
Line 23, please delete "acorn" and insert -- according --.

Column 10,
Line 14, please delete "position-intermediate" and insert -- position intermediate --.

Signed and Sealed this

Thirteenth Day of July, 2004

JON W. DUDAS
*Acting Director of the United States Patent and Trademark Office*